United States Patent
Itoi

(10) Patent No.: US 6,810,009 B1
(45) Date of Patent: Oct. 26, 2004

(54) CONNECTION SETTING METHOD IN ATM NETWORK

(75) Inventor: Yoshihiro Itoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/386,825

(22) Filed: Aug. 31, 1999

(30) Foreign Application Priority Data

Sep. 1, 1998 (JP) .......................................... 10-247402

(51) Int. Cl.$^7$ .......................... G06F 11/00; H04L 12/28
(52) U.S. Cl. .................... 370/218; 370/238.1; 370/242; 370/395.1
(58) Field of Search ................................ 370/216, 217, 370/218, 219, 220, 221, 227, 228, 236.1, 236.2, 238.1, 223, 225, 237, 242, 395.1, 400

(56) References Cited

U.S. PATENT DOCUMENTS

| | | | |
|---|---|---|---|
| 5,867,481 A | * | 2/1999 | Miyagi |
| 6,011,780 A | * | 1/2000 | Vaman |
| 6,181,679 B1 | * | 1/2001 | Ashton |
| 6,226,260 B1 | * | 5/2001 | McDysan |
| 6,272,107 B1 | * | 8/2001 | Rochberger et al. |
| 6,292,463 B1 | * | 9/2001 | Burns |
| 6,327,270 B1 | * | 12/2001 | Christie |
| 6,343,065 B1 | * | 1/2002 | Serbest et al. |
| 6,356,564 B1 | * | 3/2002 | Bawa |
| 6,424,629 B1 | * | 7/2002 | Rubino et al. |
| 6,442,132 B1 | * | 8/2002 | Burns et al. |
| 6,490,245 B2 | * | 12/2002 | Burns et al. |

* cited by examiner

Primary Examiner—Afsar Qureshi
(74) Attorney, Agent, or Firm—Katten Muchin Zavis Rosenman

(57) ABSTRACT

In an ATM network in which an SPVC is realized and in which in order to carry out speedily the detection of failures on a line, a software PVC realized by a P-NNI, i.e., a PVC is established between a source private network and a destination private network, and the dynamic routing is carried out between ATM switching equipment on the basis of the establishment of an SVC, the ATM switching equipment is provided with failure detecting means for detecting occurrence of failures on a line in an ATM physical layer. A failure information reporting cell containing therein the information which is used to specify at least the source ATM switching equipment and the failure destination ATM switching equipment is produced on the basis of the failures which have been detected in the physical layer and the occurrence of the failures is reported to each of the ATM switching equipment. Then, the ATM switching equipment as the transmission side node reestablishes, in response to the failure information reporting cell, an alternate SVC which is set in such a way as to avoid the failure location.

8 Claims, 19 Drawing Sheets

| OSI REFERENCE MODEL | ATM HIERARCHY MODEL | | | FUNCTIONS OF HIERARCHIES |
|---|---|---|---|---|
| | MANAGEMENT FUNCTION OAM | | | |
| DATA LINE LAYER | AAL LAYER | CS | SSCS | · CONVERGENCE (INTERFACE WITH UPPER LAYER) |
| | | | CPCS | |
| | | SAR | | · ASSEMBLY/DISASSEMBLY OF CELLS |
| | ATM LAYER | | | · ROUTING OF VP/VC<br>· PRODUCTION/EXTRACTION OF CELL HEADER<br>· MULTIPLEXING/SEPARATION OF CELLS |
| PHYSICAL LAYER | PHYSICAL LAYER | TC | | · CELL SYNCHRONIZATION<br>· INSERTION/DEINSERTION INTO/FROM TRANSMISSION FRAME<br>· PRODUCTION/RECOVERY OF TRANSMISSION FRAME |
| | | PMD | | · BIT TIMING<br>· TRANSMISSION MEDIA |

FIG. 2

PMD(Pyshical Media Dependent Sublayer)

AAL(ATM Adaptation Layer)

TC(Transmission Convergence Sublayer)

SAR(Segmentation and Reassembly Sublayer)

CS(Convergence Sublayer)

SSCS(Service Specific Convergence Sublayer)

CPCS(Common Part Convergence Sublayer)

| SPVC MANAGEMENT NUMBER | TERMINAL #A | TERMINAL #B | SVC MANAGEMENT NUMBER | UTILIZATION STATE |
|---|---|---|---|---|
| 1 | a | A | 1 | ACT |
|  |  |  | 2 | STANDBY |
| 2 | b | B | 3 | ACT |
|  |  |  | 4 | STANDBY |
| 3 | c | C | 5 | STANDBY |
|  |  |  | 6 | ACT |

| TERMINAL MANAGEMENT | ATM ADDRESS | PVC VPI | VCI |
|---|---|---|---|
| A | AAAAAAAA | 1 | 100 |
| B | BBBBBBBB | 1 | 233 |
| C | CCCCCCCC | 3 | 423 |
| a | DDDDDDDD | 34 | 342 |
| b | EEEEEEEE | 5 | 634 |
| c | FFFFFFFF | 10 | 22 |

|  | BIT LOCATION | | | KIND OF PAYLOAD |
|---|---|---|---|---|
|  | 4 | 3 | 2 | |
| PAYLOAD CELL | | | | |
| USER INFORMATION CELL | 0 | 0 | 0 | |
| | | | 1 | |
| | | 1 | 0 | |
| | | | 1 | |
| OTHER CELLS | 1 | 0 | 0 | SEGMENT OAMF5 FLOW |
| | | | 1 | END·END OAMF5 FLOW |
| | | 1 | 0 | RESOURCE MANGEMENT CELL |
| | | | 1 | STAND-BY |

| CELL KIND | CELL TYPE | FUNCTION TYPE | FUNCTION |
|---|---|---|---|
| FAILURE REPORT | 0001 | 0001 | REPORT FAILURES |
| FAILURE REPORT RESPONSE | 0001 | 0010 | RESPONSE TO REPORT OF FAILURES |
| RECOVERY REPORT | 0010 | 0001 | REPORT RECOVERY |
| RECOVERY REPORT RESPONSE | 0010 | 0010 | RESPONSE TO REPORT OF RECOVERY |

CONNECTION SETTING METHOD IN ATM NETWORK

BACKGROUND OF THE INVENTION

Field of the Invention

The present invention relates to the technology of reconnecting the connection in failures of a line/failures of an apparatus in an ATM switched network, particularly in an ATM swiched network in which terminals are connected through software PVCs.

A P-NNI (Private—Network Node Interface) is one of service interfaces of an ATM (Asynchronous Transfer Mode) switched network, and is the convention for connecting between the public networks and the private networks in order to switch the address information or the routing information.

In the P-NNI, it is possible to establish a software PVC (software Permanent Virtual Connection: hereinafter, referred to as "an SPVC" or "a software PVC" for short, when applicable). In this case, the PVC is established only between a UNI (User Network Information) of a source and the UNI of a destination, and ATM nodes (ATM switching equipment) which are arranged in the middle of the UNI of the source and the UNI of the destination are connected through an SVC (Switched Virtual connection). As a result, it is said that the P-NNI is the technology which is capable of realizing the dynamic routing between the ATM switching equipment.

Now, the description will hereinafter be given with respect to the system configuration of the ATM network with reference to FIG. 1.

In the figure, a terminal 101a (#A) and ATM switching equipment 102, and ATM switching equipment 104 and a terminal 101b (#b) are respectively connected through PVCs (Permanent Virtual Connections), and interchange routes (between ATM switching equipment) are connected through the SVCs.

Now, when the SPVC is set in the ATM switching equipment 102, for the SVC part of the interchange routes, the ATM switching equipment 102, 103 and 104 automatically sets the connections to maintain the connections. The features of this system are the following two points.

(1) Automatic Alternate Function of PVC

Since the ATM switching network has the SVCs set therein, if a VC (Virtual Connection) is, in occurrence of the failures, released due to the failures or the like (e.g., occurs between the ATM switching equipment 103 and 104), then the ATM switching equipment 102 on the transmission side recalls the ATM switching equipment 104 on the reception side, thereby ensuring the alternate route (the ATM switching equipment 102→105→104).

(2) Simplified Function of PVC Setting

By only setting the terminal information of the both of the terminals (an ATM address of the terminal 101a (#A), VPI/VCI=a, an ATM address of the terminal 101b (#b), and VPI/VCI=b) and the like in both of the ATM switching equipment 102 on the transmission side and the ATM switching equipment 104 on the reception side, the PVC over the overall of the ATM network can be set.

FIG. 2 shows a hierarchy structure in the ATM. In occurrence of the failures in the above-mentioned paragraph (1), the alternate route is determined in the ATM layer shown in FIG. 2.

FIG. 3 shows the procedure of this failure recovery in the form of a flow chart.

When the failures occur in the location between the switching equipment 103 and 104 as shown in FIG. 1 (Step 301), in order that the processing may proceed to the alternate operation in the ATM switching network, the following processings are required.

First of all, the VC (Virtual Connection) needs to be disconnected in the ATM switching network (Step 302).

In this connection, in the data link monitoring timer installed in each of the ATM switching equipment, it takes normally about 17 seconds to disconnect the VC. This numeric value is obtained by summing 7 seconds defined for Timer No Response and 10 seconds of a L3 timer T309.

If the contents of a routing table are updated in recalling made from the terminal 101a (#A)(an Owner switching equipment in the case of the SPVC, but in this case, the ATM switching equipment 102), the alternate route is ensured.

Now, in order to make a recall, it becomes the prerequisite that any of the prior calls is already released. The data link monitoring timer for confirming the disconnection of the VC is arranged in the ATM layer in the hierarchy structure shown in FIG. 2.

Secondly, it is required that the contents of the routing table are already updated (Step 303).

Now, the numeric value which is obtained by multiplying "Hello packet sending time interval" by "the number of Hello packet sendings" becomes the update time of the routing table. Then, if the interval value is 15 seconds×5 times, then the update time is 75 seconds in total.

This results from the function wherein "It is defined that the Hello packets are transmitted at intervals of 15 seconds from the adjacent node. If the Hello packet has not arrived, though the time period for the five times has elapsed for which the corresponding Hello packet is expected to essentially arrive, then the ATM switching equipment judges that the route to the adjacent node can not be used to update the contents of the routing table."

The reception sequence of the Hello packet between the nodes in occurrence of the failures in the prior art is shown in the form of a diagram in FIG. 6.

The route changing processing is only started when both of the steps 302 and 303 as described above have been confirmed (Step 305).

By the way, as apparent from the above-mentioned description, the time period required to update the contents of the routing table in the ATM switching equipment must be made longer than the time period required to disconnect the VC.

Now, in order that the alternate route may be set as speedily as possible, the time period required to update the contents of the routing table has only to be made slightly longer than the time period required to disconnect the VC.

The example associated therewith will be shown as follows.

Time intervals of sending Hello packets=15 seconds (setable range is a to b seconds).

The number of Hello packet sendings=2 times (setable range is c to d times).

If the values as described above are adopted, then the contents of the routing table are updated with the following conditions.

Minimum: 15 seconds×2 times=30 seconds

Maximum: 14 seconds+15 seconds×2 times=44 seconds (The maximum time period required for the case where the failures occur on the line right after the Hello packet has been received from the adjacent node).

Now, with respect to the reconnection of the alternative connection in failures due to the SPVC, when making a detour to avoid the failure route, even if the route is restored from the failures to its former state, the terminal 101*a* (#A) and the ATM switching equipment 102 are connected to each other through the PVC, and hence no recall is made from the terminal 101*a* (#A). Therefore, since the ATM switching equipment 102 continues to maintain the SVC connection, no return of the state is made automatically back to the original route (the route in which the failures are recovered: the ATM switching equipment 102→103→104).

For this reason, there arises the problem that the connections for which the alternate route is selected are concentrated on some intervals and hence the network performance is continued to be pressed to induce the overcrowding.

In order to use the original route which has been restored from the failures to its former state, the definition in the table needs to be once released to carry out the registration again.

In this connection, there is known an OAM (Operation Administration and Maintenance) cell for reporting the failures between the nodes (between the ATM switching equipment) within the ATM network. As shown in FIG. 4, however, while after having recognized the node failures (Step 401), the failure report is made every connection (Step 402), the OAM cell has only the function of reporting in which direction the failures have occurred in the connection and hence does not contain therein the information which is used to specify the failure location at all.

For this reason, the node only receives the OAM cell and hence does not utilize the OAM cell for any of the operations at all (Step 403). In addition, while the received OAM cell may be utilized for the traffic control such as the overcrowding control in some cases (Step 404), it can not be utilized for the route control.

In the light of the foregoing, the present invention was made in order to solve the above-mentioned problems associated with the prior art, and it is therefore an object of the present invention to provide the technology which is capable of realizing the reconnection of an SVC (a software PVC) in failures on a line/failures in an apparatus for a very short time period.

SUMMARY OF THE INVENTION

According to first solving means of the present invention, in an ATM network in which a software PVC which is realized by a P-NNI, i.e., a PVC is established between a source private network and a destination private network, and the dynamic routing is carried out between ATM switching equipment on the basis of the establishment of an SVC, the ATM switching equipment is provided with failure detecting means for detecting occurrence of failures on a line.

Then, on the basis of the failures which have been detected in the physical layer, a failure information reporting cell is produced which contains therein the information used to specify at least the source ATM switching equipment and the ATM switching equipment for which the failures have occurred to report the occurrence of the failures of each of the ATM switching equipment. Then, the ATM switching equipment as the transmission side node reestablishes, in response to the above-mentioned failure information reporting cell, the alternate SVC which is set in such a way as to avoid the failure location.

In such a way, the detection of the failures is carried out in the ATM physical layer, which makes possible the rapid recover processing.

According to second solving means, in the above-mentioned first solving means, the recover of the failures which occurred on the line is detected in the physical layer of the ATM in a similar manner to that described above.

In such a way, the recovery reporting cell is reported to the ATM switching equipment as the transmission side node on the basis of the recover information which has been detected in the physical layer, whereby the SVC can be speedily established through the recover route. In this connection, at this time, the recovered SVC in the route in which the failures have been recovered is established while maintaining the alternate SVC which is set in such a way as to avoid the above-mentioned failure location, whereby the migration from the alternate SVC to the recover SVC becomes possible without interrupting the connection state through the SVC within the ATM network.

According to third solving means, in the above-mentioned first solving means, there is provided a management table in which the correspondence relation among the information which is used to specify the above-mentioned two terminals, the actual SVC which is established between the ATM switching equipment in the two terminals, and the stand-by SVC which is used in occurrence of failures.

As a result, the ATM switching equipment on the transmission side can readily set the alternate SVC by making reference to the management table.

According to fourth solving means, in the above-mentioned first solving means, for the purpose of detecting any of failures, the physical states of line interfaces from the adjacent ATM switching equipment are monitored, and the line failures are detected on the basis of the light reception loss, the pull out and the like. The SVC is established with such concrete and physical failure detection as a turning point, whereby it is possible to cope very speedily with the failures.

BRIEF DESCRIPTION OF THE DRAWINGS

The above and other objects as well as advantages of the present invention will become clear by the following description of the preferred embodiment of the present invention with reference to the accompanying drawings, wherein:

FIG. 2 is a diagram useful in explaining the hierarchy structure of an ATM;

FIG. 20 is a diagram useful in explaining an SPVC management table according to the embodiment;

FIG. 21 is a diagram useful in explaining a terminal management table according to the embodiment;

FIG. 22 is a diagram useful in explaining the utilization state in a payload cell of an ATM cell according to the embodiment; and FIG. 23 is a diagram useful in explaining the state in a cell format of the failure reporting cell and a recover reporting cell according to the embodiment.

DETAILED DESCRIPTION OF THE PREFERRED EMBODIMENTS

The preferred embodiment of the present invention will hereinafter be described in detail with reference to the accompanying drawings.

Figure 1:
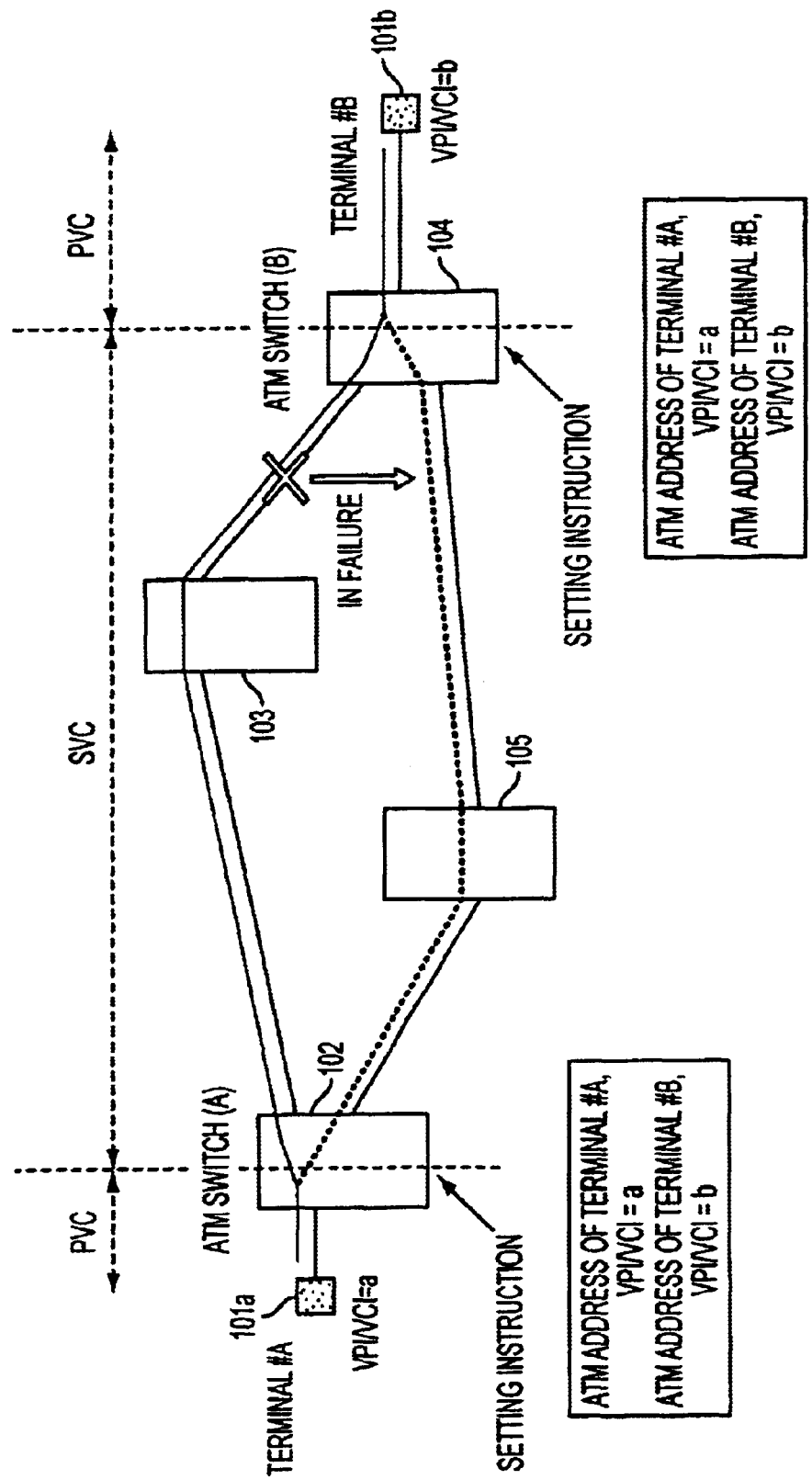
FIG. 1 is a block diagram showing a system configuration of an ATM network.
Figure 3:
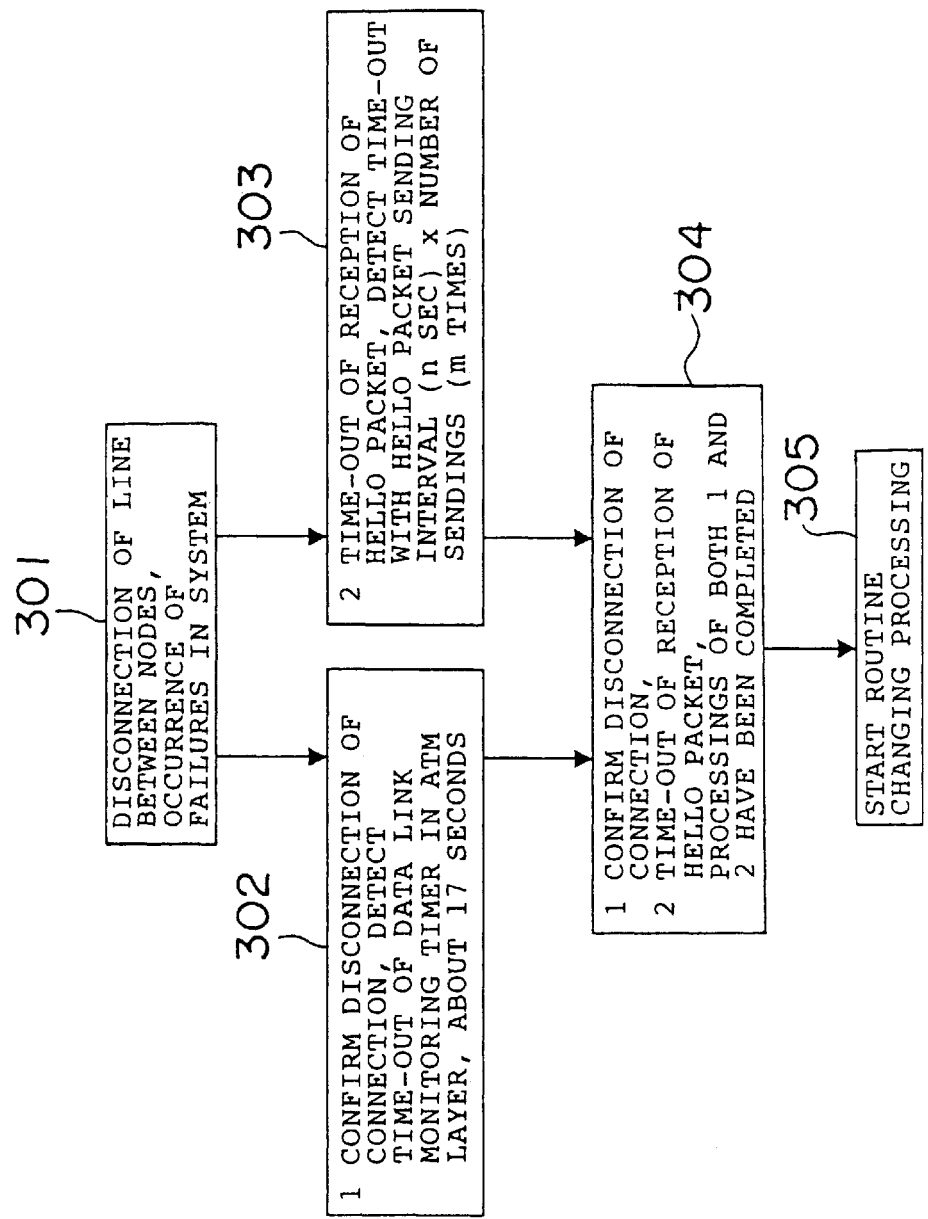
FIG. 3 is a flow chart useful in explaining the alternate procedure for an SPVC.
Figure 4:
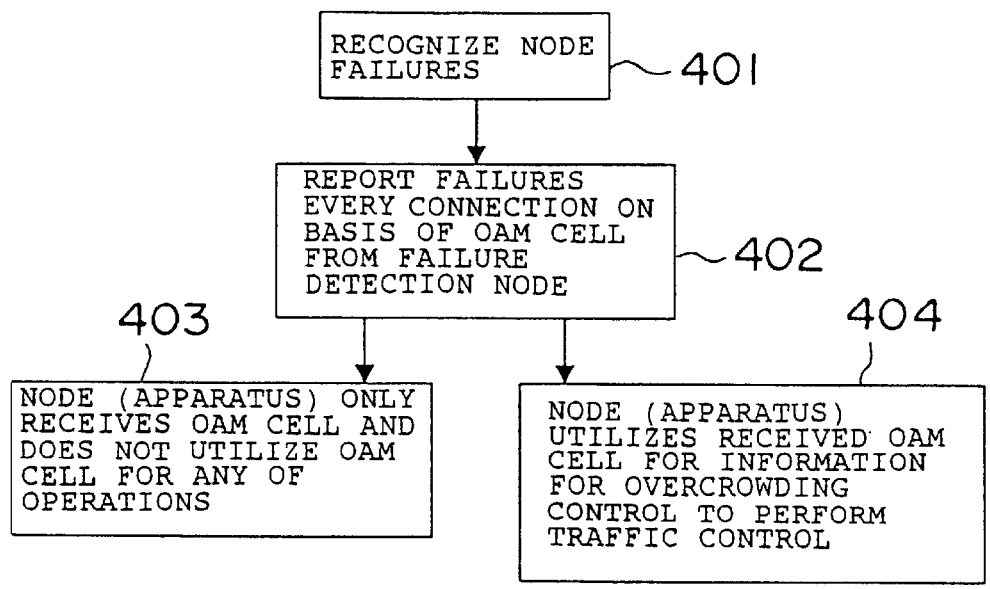
FIG. 4 is a flow chart useful in explaining the report of failures through an OAM cell.
Figure 5:
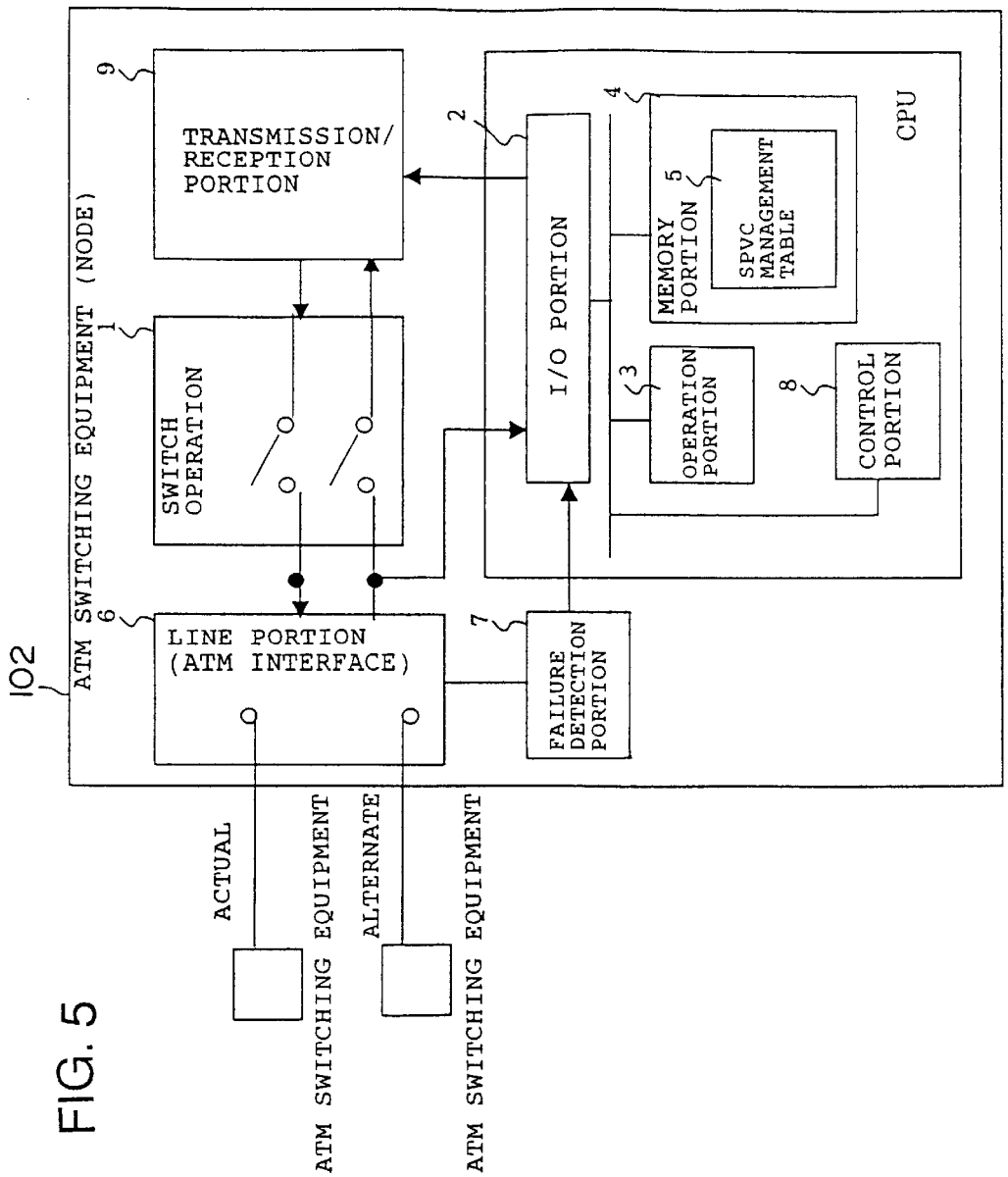
FIG. 5 is a block diagram showing a configuration of ATM switching equipment according to an embodiment of the present invention.
Figure 6:
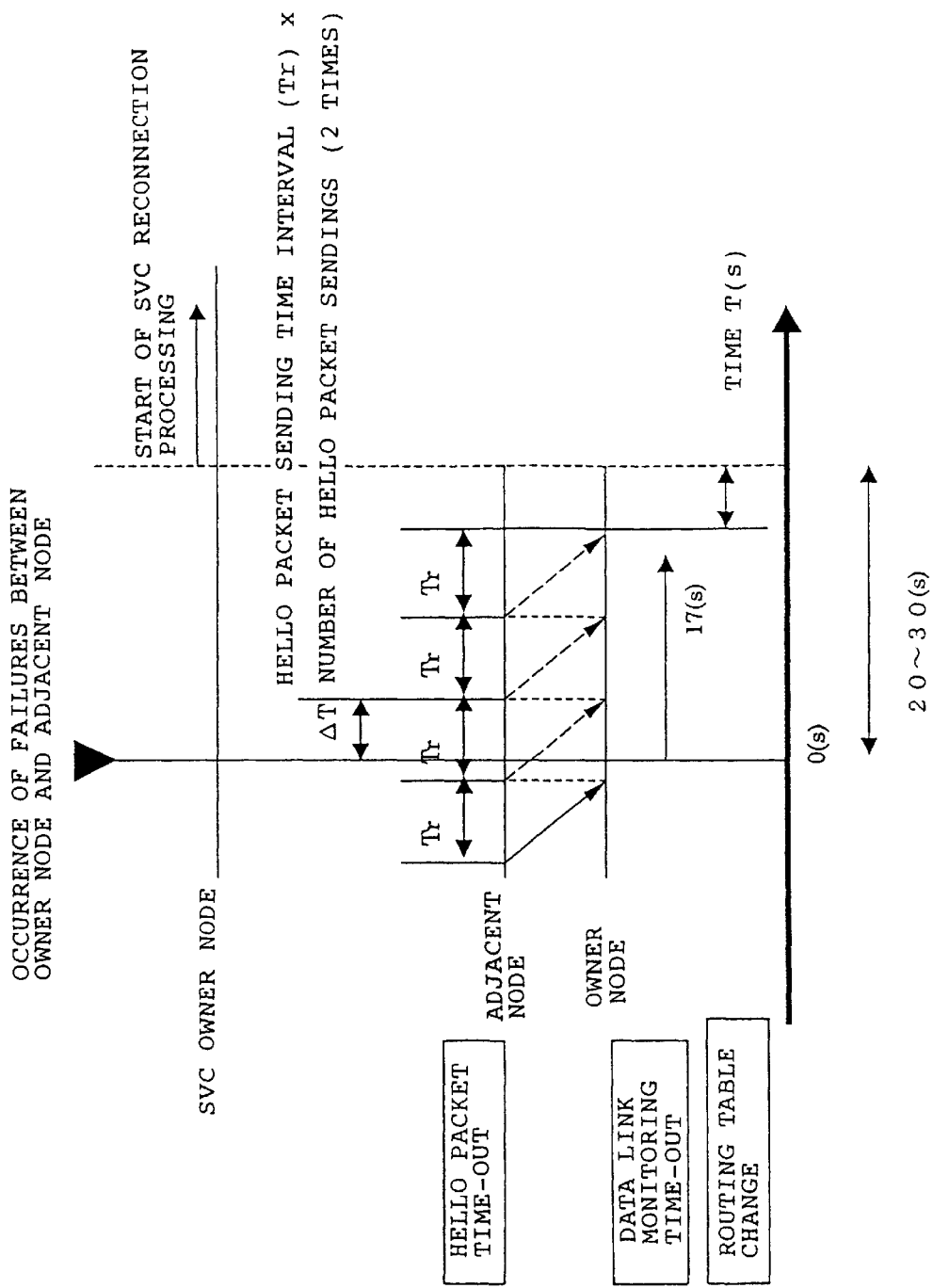
FIG. 6 is a sequence diagram useful in explaining the detection of failures in the prior art.

FIG. 5 is a block diagram showing a configuration of ATM switching equipment according to an embodiment of the present invention. While in the present embodiment, ATM switching equipment 102 will be described as a typical one from now on, other ATM switching equipment 103, 104 and 105 has the same configuration as that of the ATM switching equipment 102.

In the figure, reference numeral 1 designates a switch portion for executing the switch processing for an ATM cell. Reference numeral 2 designates an I/O portion which functions as an interface with a control portion within the switch portion.

Reference numeral 3 designates an operation portion which includes an operation processor and the like. Reference numeral 4 designates a memory portion in which an SPVC management table 5 is set. As shown in FIG. 20, this SPVC management table 5 can manage the correspondence among the PVC and the SVC of the SPVC and also can registrate therein the actual SVC between the nodes and the stand-by SVC which becomes available in occurrence of failures.

In addition, the memory portion 4 may be provided with a terminal management table as shown in FIG. 21 as well as the above-mentioned SPVC management table 5. In this terminal management table, as shown in FIG. 21, the relation between the ATM switching equipment and the terminals is defined, and the correspondence among the terminal management numbers, the ATM address and the PVC (the VPI and the VCI) is defined.

In FIG. 5, reference numeral 6 designates a line portion which functions as the line interface for accommodating therein the actual line and the alternate line. Reference numeral 7 designates a failure detection portion for detecting failures on arrival of the OAM cell. Reference numeral 8 designates a control portion which includes a processor. Reference numeral 9 designates a transmission/reception portion for transmitting/receiving the ATM cell.

In the figure, the switching processing for the ATM cell is executed by the switch portion 1, and the SVC processing is executed in the operation portion 3, the memory portion 4 and the control portion 8 through the I/O portion 2.

Next, the description will hereinbelow be given with respect to the processings for occurrence of failures, avoidance of failures and recovery of failures which are executed in this order with reference to FIGS. 11 to 19.

Figure 11:
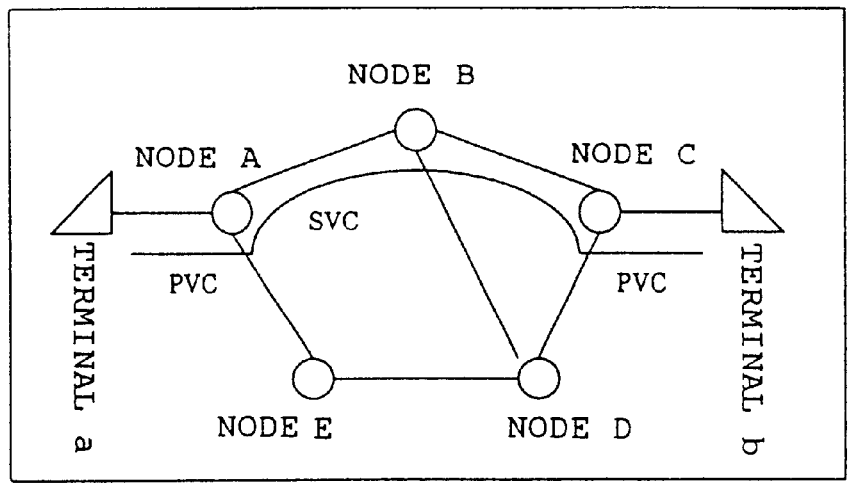
FIG. 11 is a schematic view showing a network configuration and a connection between terminals according to the embodiment.

The network configuration and the connection between terminals are as shown in FIG. 11.

With respect to the relation between terminals a and c, the terminal a and a node A, and a node C and the terminal c are respectively connected through a PVC, and the node A, a node B and the node C which are arranged in this order are connected through an SVC.

Figure 12:
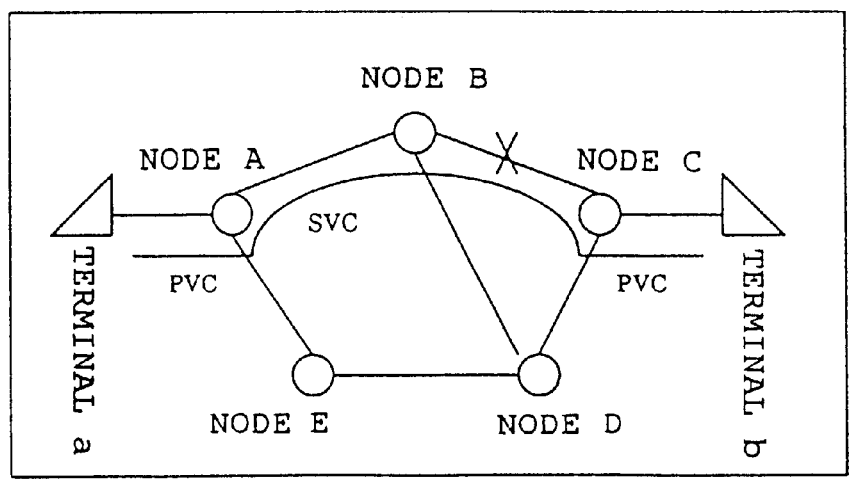
FIG. 12 is a schematic view useful in explaining the state of occurrence of failures in the network configuration of the embodiment.

First of all, as shown in FIG. 12, it is assumed that the line failures occur in the location between the node B and the node C.

In this connection, as described above, since in the prior art, the judgement for the disconnection of the connection is carried out in the ATM layer shown in FIG. 2, the route is not switched until a time period has elapsed for which the data link monitoring has reached a time-out.

On the other hand, in the present embodiment, the judgement for the disconnection of the connection after the failures have occurred is carried out in the physical layer as shown in FIG. 2 on the basis of the detection of the failures in the hardware, whereby the failure detection at the level of several milliseconds to several hundreds milliseconds and the switching processing are realized.

Since when the failures in the physical layer such as the light reception loss (LOS: Loss Of Signal) or the pull out (LOF: Loss Of Frame, OFF: Out Of Frame, LOP: Loss Of Pointer) in the line portion 6 of the node (the node B in this case) have been detected by the failure detection portion 7, the data monitoring time-out processing is executed with the failure detection as a trigger, the failure information of interest is sent to the control portion 8 through the I/O portion 2.

Figure 7:
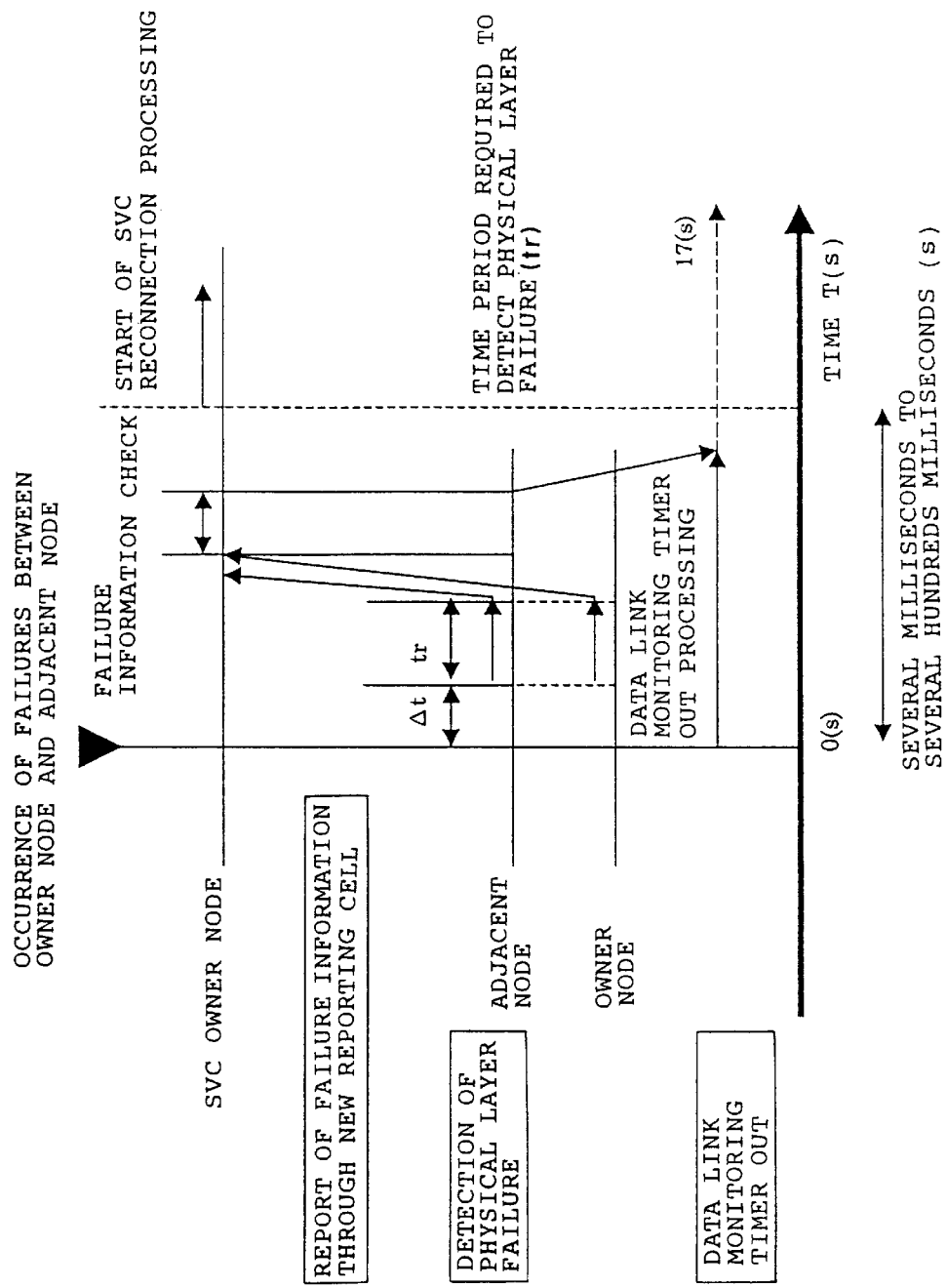
FIG. 7 is a sequence diagram useful in explaining the detection of failures according to the embodiment.

The failure information check sequence in the present embodiment at this time is shown in FIG. 7.

Figure 13:
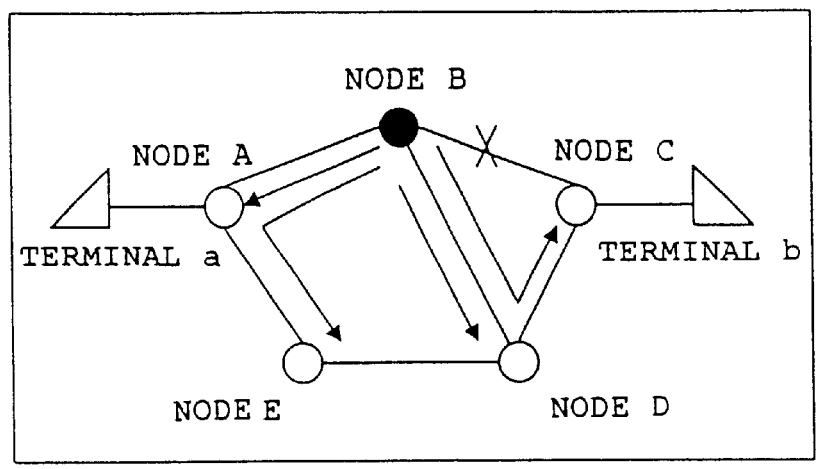
FIG. 13 is a schematic view useful in explaining the first state of transmission of the failure information reporting cell of the embodiment.
Figure 14:
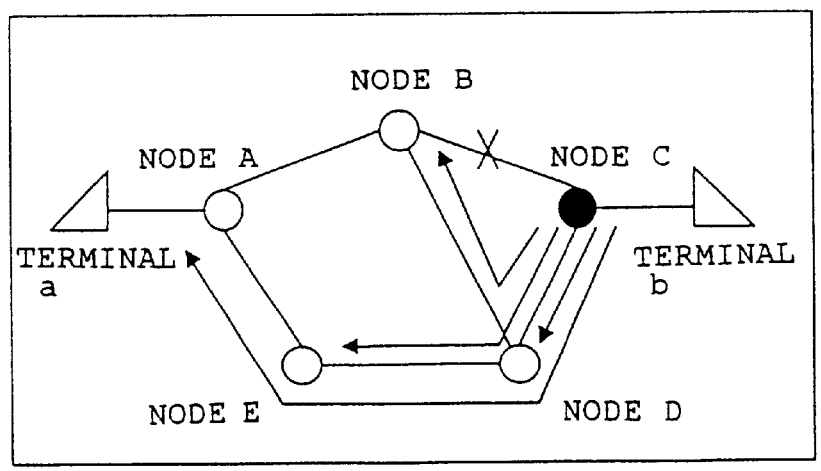
FIG. 14 is a schematic view useful in explaining the second state of transmission of the failure information reporting cell of the embodiment.

Next, as shown in FIG. 13, detection of the failures is reported from the node B to other nodes (the nodes A, C, E and D).

Alternatively, this failure report may be carried out from the node C to other nodes (the nodes A, B, D and E).

Each of the nodes (the nodes B and C in this case) which have detected the failures occurring in the location therebetween detects the information, which can not be communicated in the network, in the failure detection portion 7, and a failure information reporting cell in which that information is collected is assembled by the operation portion 3, the memory portion 4 and the control portion 8.

Then, this failure information reporting cell is transmitted to all of the nodes in the network (in the ATM network peer group) to which the report can be sent. In each of the nodes, in response to the failure information reporting cell, the SVC is reestablished in such a way as to avoid the failure location.

A payload cell as shown in FIG. 22 may be used as the above-mentioned failure information reporting cell. Thus, there is the method of utilizing the stand-by values of the payload cell. With respect to the transmission/reception of the information, there is utilized the cell which has, as the information, a cell type and a function type kind within a cell format shown in FIG. 10 and a cell format shown in FIG. 23.

Figure 10:
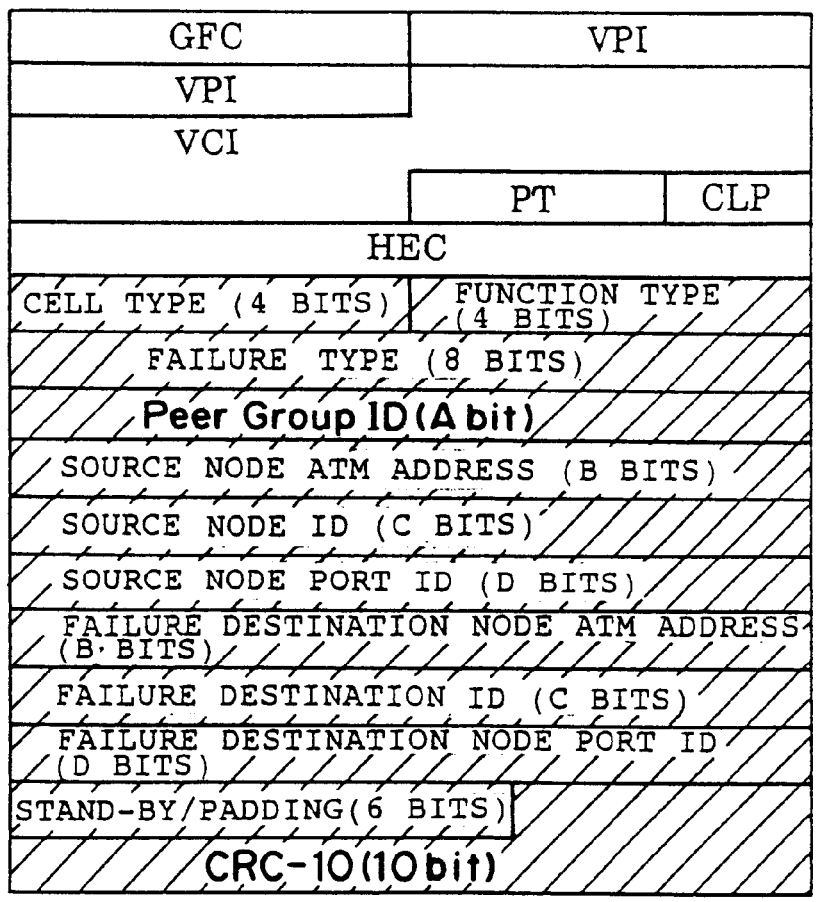
FIG. 10 is a diagram showing a format of a failure information reporting cell and a recover reporting cell according to the embodiment.

Now, FIG. 10 shows the format of the ATM cell when the ATM cell is also used as the failure information reporting cell. As shown in the figure, there are provided in the payload areas such as a cell type area of 4 bits, a function type area of 4 bits, a failure type area of 8 bits, a peer group ID area of arbitrary bits, a source node ATM address, a source node ID, a source node port ID, a failure destination node ATM address, a failure destination node ID, and a failure destination node port ID.

FIG. 23 shows a list of the bits which are registrated in the cell type area and the function type area within the above-mentioned format.

That is, when the failure information reporting cell of interest is the failure report, "0001" and "0001" are written to the column of the cell type and the column of the function type, respectively. In addition, when the failure information reporting cell is the failure report response, "0001" and "0010" are written to the column of the cell type and the column of the function type, respectively. In addition, when the failure information reporting cell is the recovery report, "0010" and "0001" are written to the column of the cell type and the column of the function type, respectively. Further, when the failure information reporting cell is the recovery report response, "0010" and "0010" are written to the column of the cell type and the column of the function type, respectively.

On the basis of the function of the failure information reporting cell as described above, each of the nodes (the ATM switching equipment) which have received the failure information reporting cell can grasp both of the failure location and the failure contents. By grasping both of the failure location and the failure contents, the node A reconnects the SVC through the alternate route (the node A→the node E→the node D→the node C) which is set in such a way as to avoid the node B having the failures.

Figure 8:
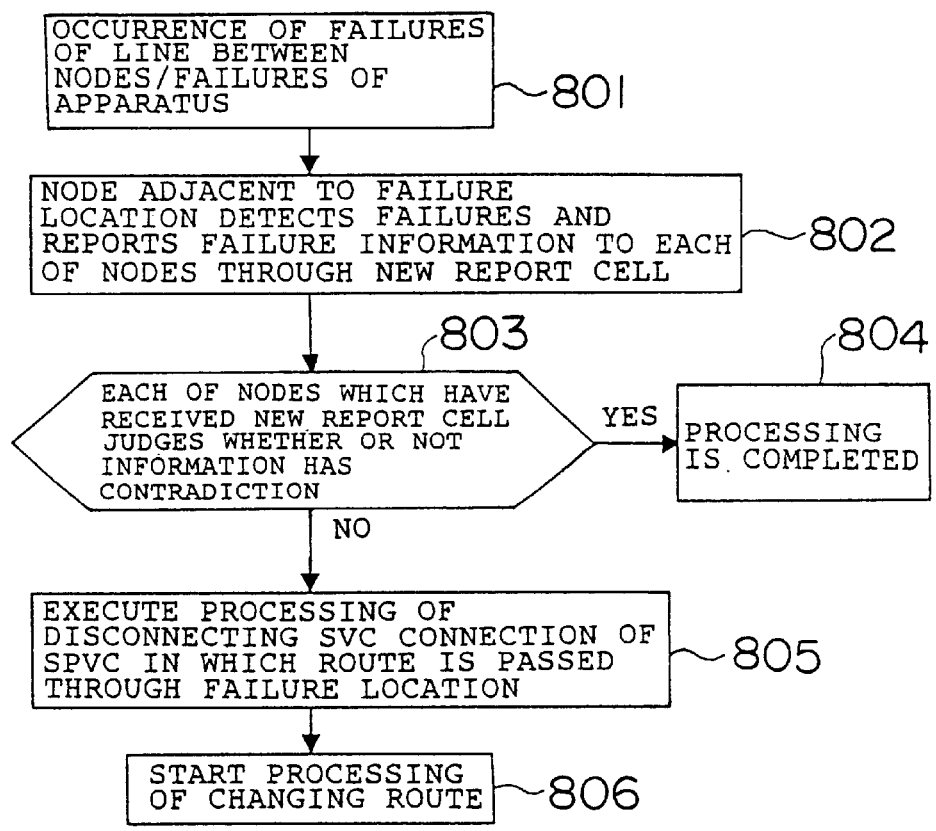
FIG. 8 is a flow chart useful in explaining the processing of disconnecting an SVC connection according to the embodiment.

The procedure as described above is shown in the form of a flow chart in FIG. 8.

That is, in the figure, when having detected occurrence of the failures of the line between the nodes or occurrence of the failures of the apparatus (Step 801), the node adjacent to the failure location detects the failures and then reports that effect to each of the nodes through the failure information reporting cell (Step 802).

Each of the nodes which have received the above-mentioned failure information reporting cell judges whether or not the information thus received has the contradiction (Step 803). If it is judged in Step 803 that the information has the contradiction, then the processing is completed (Step 804). On the other hand, if it is judged in Step 803 that the information has no contradiction, then the processing of disconnecting the SVC connection of the SPVC in which the route passes through the failure location is executed (Step 805).

In such a way, the processing of changing the route is started (Step 806).

Next, the description will hereinbelow be given with respect to the processing when the line failures have been recovered.

Figure 15:
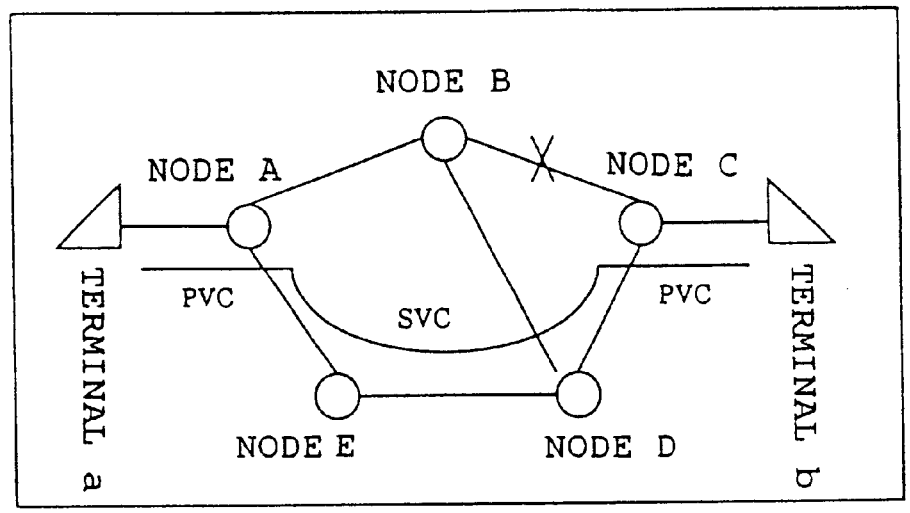
FIG. 15 is a schematic view useful in explaining the state of establishment of an alternate SVC in the network configuration of the embodiment.

In the network configuration in which the alternate SVC shown in FIG. 15 is set, each of the node B and the node C detects the recovery of the line failures.

The detection of the hardware failure recovery of the line/apparatus failures is utilized as a turning point for reconnection of the connection.

To put it concretely, each of the nodes B and C reconnects the SVC before the detour with as a trigger the detection of the recovery of the failures in the physical layer due to the light reception loss or the pull out such as LOS (Loss Of Signal), or LOF (Loss Of Frame), OFF (Out Of Frame) or LOP (Loss Of Pointer) in the line portion 6.

Figure 16:
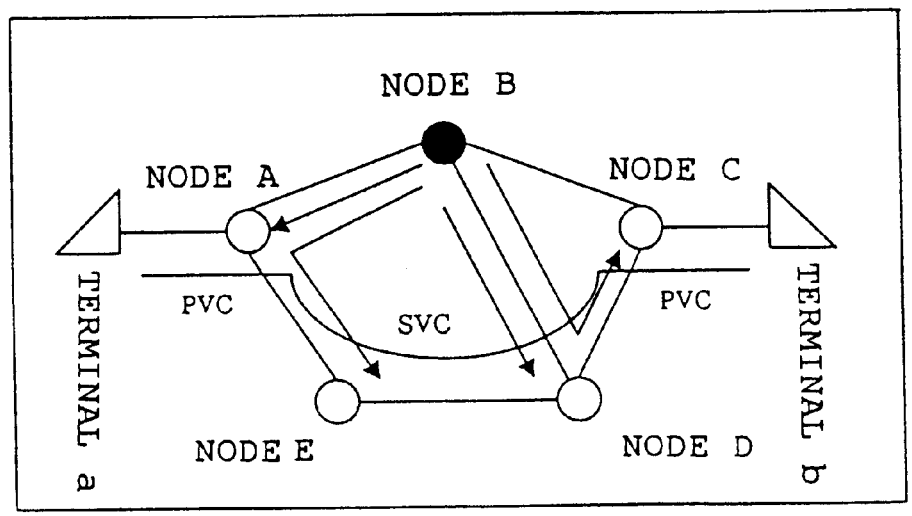
FIG. 16 is a schematic view useful in explaining the first state of transmission of the recover reporting cell in the network configuration of the embodiment.
Figure 17:
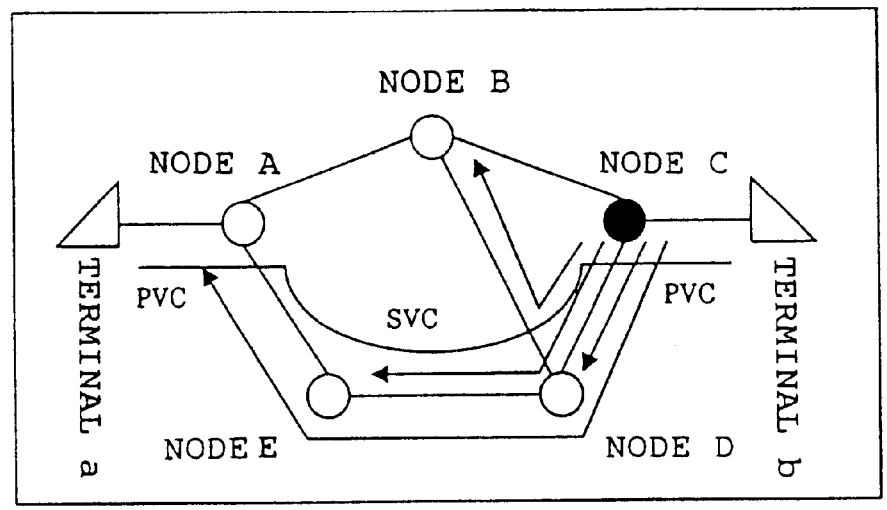
FIG. 17 is a schematic view useful in explaining the second state of transmission of the recover reporting cell in the network configuration of the embodiment.
Figure 18:
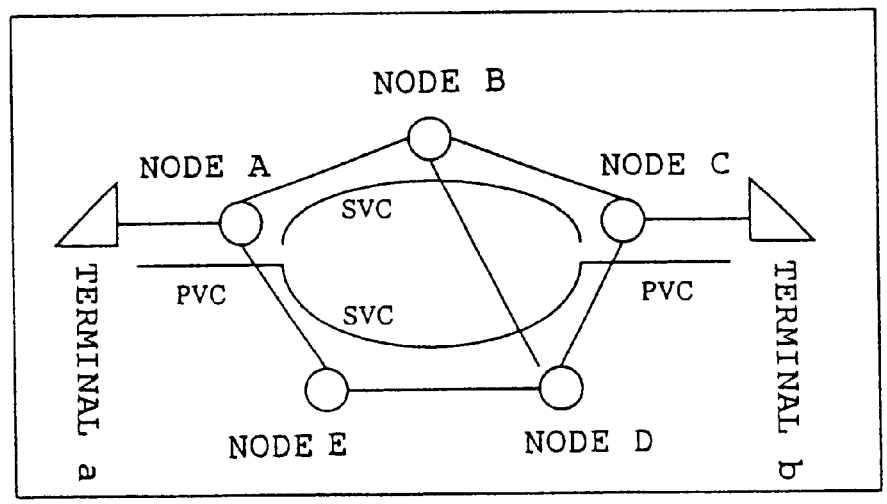
FIG. 18 is a schematic view useful in explaining the state in which the alternate SVC and the recovered SVC coexist in the network configuration of the embodiment.

The report of the recovery of the failures is made from the node B to other nodes (the nodes A, C, D and E) as shown in FIG. 16. In addition, as shown in FIG. 17, this report is also made from the node C to other nodes (the nodes A, B, D and E).

In such a way, each of the nodes B and C which have detected the recovery of the failures makes the report to all of the nodes, to which the report can be made, within the network (within the ATM network peer group) in the form of the newly produced failure information reporting cell.

As for the above-mentioned failure information reporting cell, similarly to the failure report as described above, the payload cell as shown in FIG. 22 can be employed. As shown in FIG. 22, there is the method of utilizing the stand-by values of the payload cell. With respect to the transmission/reception of the information, the cell is utilized which has as the information the cell type and the function type kind within the cell format shown in FIG. 10 and the cell format shown in FIG. 23. As a result, in the nodes, each of the nodes which have received the failure information reporting cell can grasp both of the failure recovery location and the failure recovery contents. By grasping both of the recovery location and the recovery contents, the node A reconnects the SVC through the route of the node A→the node B→the node C→which was utilized before occurrence of the failures (refer to FIG. 18).

The node (the node A) which has received the failure recovery report reconnects automatically the SVC through the route (the node A→the node B→the node C) before occurrence of the failures without disconnecting the SVC (the node A→the node E→the node D→the node C) which is set in such a way as to make a detour to avoid the failure location. The information relating to the relation between the PVC and the SVC in the SPVC for realizing this is managed in the SPVC management table 5 in the memory portion 4 shown in FIG. 5. The contents of this management table 5 are shown in FIG. 20. As shown in the figure, the ATM address and the values of the PVCs of the VPI and the VCI are made correspond to one another with the terminal management number as a key in the management table 5.

Figure 19:
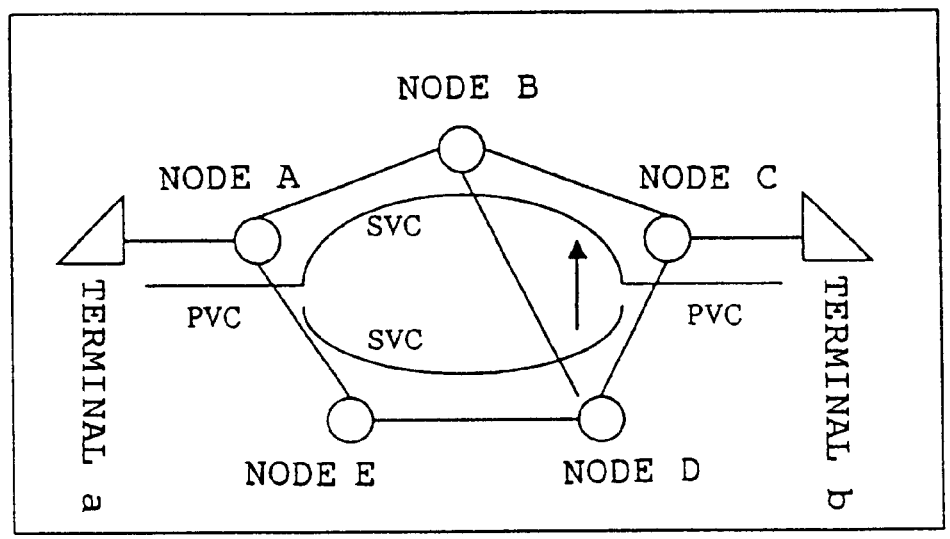
FIG. 19 is a schematic view useful in explaining the state of the connection change in recover of failures in the network configuration of the embodiment.

Next, as shown in FIG. 19, the alternate route (the node A→the node E→the node D→the node C) is disconnected to be switched over to the recovered route (the node A→the node B→the node C).

In this connection, in order that the PVC and the SVC of the SPVC may be related to each other, a management table as shown in FIG. 21 is provided separately from the P-NNI to carry out the management.

Figure 9:
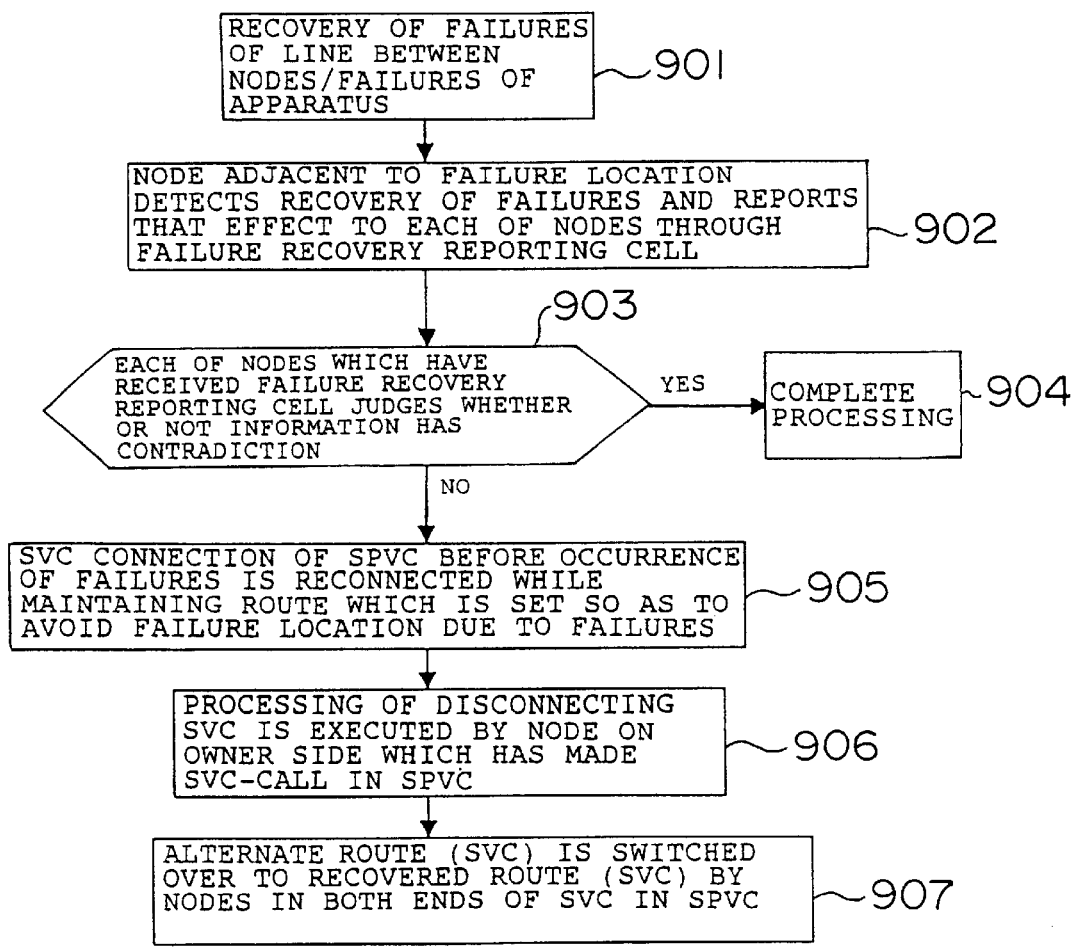
FIG. 9 is a flow chart useful in explaining the procedure of establishing a recover SVC according to the embodiment.

On the basis of the management utilizing that management table, two SVCs are made simultaneously present for one SPVC connection, and in response to the failure recovery reporting cell which is used to report the failure recovery, the SVC which is set in such a way as to make a detour to avoid the failure location is switched over to the original SVC. An example of the SPVC management table is shown in FIG. 20. In addition, the reconnection procedure of the present invention is shown in FIG. 9. The SPVC management table has the correspondence relation among SPVC management numbers, a terminal #A (101a in this case), a terminal #B (101b in this case), SVC management numbers and utilization state (e.g., either the actual system (ACT) or the stand-by system (STANDBY) is available).

FIG. 9 is, as described above, a flow chart useful in explaining the procedure of switching the alternate route over to the original route.

In the switching processing, when the failures of the line between the nodes or the failures of the apparatus have been recovered (Step 901), the node adjacent to the failure location detects the recovery of the failures (Step 902), and also reports that effect to each of the nodes through the failure recovery reporting cell.

Each of the nodes which have received the failure recovery reporting cell judges whether or not the information has the contradiction (Step 903). If it is judged in Step 903 that the information has the contradiction, then the processing is completed (Step 904).

On the other hand, if it is judged in Step 903 that the information has no contradiction, then the SVC connection of the SPVC before occurrence of the failures is reconnected while maintaining the route which is set in such a way as to avoid the failure location due to the failures (Step 905).

Then, the processing of disconnecting the SVC is executed by the node on the owner side (the ATM switching equipment 102 in this case) which has made the SVC-call in the SPVC (Step 906). Finally, the alternate route (the SVC) is switched over to the recovered route (the SVC) by the nodes on the both ends of the SVC in the SPVC (Step 907).

In such a way, when the failures have been recovered, it is possible to switch the alternate route over to the original route.

While the present invention has been particularly shown and described with reference to the preferred embodiment, it will be understood that the various changes and modifications will occur to those skilled in the art without departing from the scope and the true spirit of the invention. The scope of the invention is therefore to be determined solely by the appended claims.

What is claimed is:

1. An ATM network in which when the communication is established between two terminals as in which a terminal and ATM switching equipment on the end side are connected to each other through a private network, a PVC is established between a source private network and a destination private network, and a dynamic routing is carried out between the ATM switching equipment on the basis of the establishment of the SVC, a connection setting method for use in said ATM network comprising the steps of:

detecting occurrence of failures on a line in a physical layer of an ATM;

monitoring, when detecting the failures the physical state of line interfaces from the adjacent ATM switching equipment to detect the line failures;

producing a failure information reporting cell containing therein information, which is used to specify at least the source ATM switching equipment and the failure destination ATM switching equipment on the basis of the detected information thereby providing a failure location; and establishing, in response to receiving a failure information reporting cell, an alternate SVC which is set in such a way as to avoid the failure location by utilizing the information of the failure information reporting cell.

2. A connection setting method for use in said ATM network according to claim 1, further comprising the steps of:

detecting the recovery of the failures on the line in the physical layer of the ATM;

producing a failure recovery reporting cell containing therein the information, which is used to specify at least the source ATM switching equipment and the recovery destination ATM switching equipment, on the basis of the detected information; and establishing, in response to the failure recovery reporting cell, the recovered SVC in the route in which the failures have been recovered while maintaining the alternate SVC which is set in such a way as to avoid the failure location.

3. A connection setting method for use in said ATM network according to claim 1, wherein the line failures include light reception loss or the pull out of the line.

4. An ATM network in which when the communication is established between two terminal as in which a terminal and ATM switching equipment on the end side are connected to each other through a private network, a PVC is established between a source private network and a destination private network, and a dynamic routine is carried out between the ATM switching equipment on the basis of the establishment of the SVC, said ATM network comprising:

failure detecting means for detecting occurrence of failures on a line in a physical layer of an ATM and monitoring the physical state of line interfaces from adjacent ATM switching equipment to detect the line failures;

failure information reporting cell producing means for producing a failure information reporting cell containing therein the information, which is used to specify at least the source ATM switching equipment and the failure destination ATM switching equipment on the basis of the information which has been detected in said failure detecting means thereby providing a failure location; and alternate SVC establishing means for receiving the failure information reporting cell and a establishing, in response to receiving a failure information reporting cell, an alternate SVC which is set in such a way as to avoid the failure location by utilizing the information of the failure information reporting cell.

5. An ATM network according to claim 4, further comprising:

failure recovery detecting means for detecting the recovery of the failures on the line in the physical layer of the ATM;

failure recovery reporting cell producing means for producing a failure recovery reporting cell containing therein the information, which is used to specify the source ATM switching equipment and the recovery destination ATM switching equipment, on the basis of the information which has been detected in said failure recovery detecting means; and recovered SVC establishing means for establishing, in response to the failure recovery reporting cell, the recovered SVC in the route in which the failures have been recovered while maintaining the alternate SVC which is set in such a way as to avoid the failure location.

6. An ATM network according to claim 4, further comprising a management table in which the correspondence relation among the information which is used to specify said two terminals, the actual SVC which is established between the ATM switching equipment located between said two terminals, and the stand-by SVC which is used in occurrence of the failures is defined.

7. An ATM network according to claim 4, where in the line failures include light reception loss or the pull out of the line.

8. An ATM network according to claim 5, further comprising a management table in which the correspondence relation among the information which is used to specify said two terminals, the actual SVC which is established between the ATM switching equipment located between said two terminals, and the stand-by SVC which is used in occurrence of the failures is defined.

* * * * *